United States Patent [19]

Simond

[11] Patent Number: 5,577,304
[45] Date of Patent: Nov. 26, 1996

[54] KARABINER WITH DYNAMIC LOCKING FEATURE

[75] Inventor: Ludger Simond, Chamonix Mont Blanc, France

[73] Assignee: Etablissements Ludger Simond Société Anonyme, Chamonix Mont Blanc, France

[21] Appl. No.: 508,965

[22] Filed: Jul. 28, 1995

[30] Foreign Application Priority Data

Aug. 12, 1994 [FR] France ............... 94 10127

[51] Int. Cl.⁶ .................................. A44B 13/00
[52] U.S. Cl. ............. 24/573.5; 24/599.1; 24/599.9
[58] Field of Search .................... 24/573.5, 599.9, 24/599.5, 599.1, 600.1, 600.5, 600.7

[56] References Cited

U.S. PATENT DOCUMENTS

| | | | |
|---|---|---|---|
| 545,680 | 9/1895 | Colbert, Jr. | 24/573.5 |
| 831,260 | 9/1906 | Borlaug | 24/573.5 |
| 2,430,985 | 11/1947 | King | 24/573.5 |
| 4,095,316 | 6/1978 | Gabriel | 24/599.1 |
| 4,206,940 | 6/1980 | Altabe | 24/599.9 |
| 4,930,194 | 6/1990 | Frechin | 24/573.5 |
| 5,357,657 | 10/1994 | Petzl . | |

FOREIGN PATENT DOCUMENTS

| | | |
|---|---|---|
| 0002396 | 6/1979 | European Pat. Off. . |
| 0606808 | 7/1994 | European Pat. Off. . |
| 997540 | 1/1952 | France . |
| 2598090 | 11/1987 | France . |
| 88/03826 | 6/1988 | WIPO . |

*Primary Examiner*—Victor N. Sakran
*Attorney, Agent, or Firm*—William H. Eilberg

[57] ABSTRACT

A karabiner comprises a generally C-shaped body the ends of which are joined by a pivoting finger, articulated at a first end and engaging at its second end with the free end of the body. The corresponding engagement ends of the finger and of the body include a male end shape and a female end shape. The male end shape has a thinner portion carrying at least one lateral protuberance and engages in a slot in the female end shape. The lateral protuberance engages in a corresponding lateral housing of the slot shaped to restrict axial relative displacement of the end shapes and to prevent the karabiner finger opening when the body is under axial traction load. A shape of this kind has no hook-shape part, and combines the functions of contributing to withstanding axial traction loads and dynamic locking on application of axial traction loads to the karabiner body.

9 Claims, 4 Drawing Sheets

KARABINER WITH DYNAMIC LOCKING FEATURE

BACKGROUND OF THE INVENTION

1. Field of the Invention

The present invention concerns karabiners for climbing, potholing and similar activities.

2. Description of the Prior Art

Karabiners normally used at present are in the shape of an elongate closed ring constituted by a generally C-shaped body with the two ends curved towards each other and separated by an opening and a finger articulated at one end to a first end of the body about a transverse axis to pivot in a pivoting plane between an open position pivoted towards the inside of the body and a closed position in which the second end of the finger engages with the second end of the body to close the opening. The respective second ends of the body and of the finger have complementary male and female end shapes adapted to fit one within the other at the end of closing movement in the pivoting plane and to limit outward movement of the finger beyond its closed position so that the karabiner is able to withstand a transverse traction load.

Prior art karabiners are described in documents WO-A-88 03826 and EP-A-0 606 808, for example.

For high resistance to longitudinal traction forces, FIGS. 1 and 2 of document WO-A-88 03826 teach the use of complementary hook shapes, for example a hook shape at the end of the finger or body engaging a crosspiece at the end of the body or finger. These shapes restrict axial separation of the respective second ends of the body and the finger upon deformation of the karabiner body in response to an axial traction load.

However, this hook shape is hazardous in that it can injure the fingers of the user, damage a rope or a strap and impede the insertion of a strap or a rope into or their extraction from the karabiner.

To prevent the hazards associated with the presence of a hook shape of this kind, the other figures of document WO-A-88 03826 and document EP-A-0 606 808 teach a longitudinal T-section body end with two lateral protuberances in a direction perpendicular to the pivoting plane of the finger, said body end engaging with a small clearance in a similar T-shape notch at the end of the finger, the notch having lateral housings in which the lateral protuberances on the body engage when the karabiner is closed. The lateral housings are shaped to oppose any axial relative displacement of the lateral protuberances of the body engaged in the housings, to prevent any axial relative separation of the respective second ends of the body and of the finger when an axial load is applied to the karabiner. At the same time, the lateral housings always allow relative displacement of the protuberances in the finger opening direction.

The prior art also includes lifting hooks as described in EP-A-0 002 396, for example, in which the end of the finger incorporates two lateral branches forming a T-shape, the T-shape end of the finger engaging in a T-shape slot at the end of the hook body.

The devices of documents EP-A-0 606 808, EP-A-0 002 396 and WO-A-88 03826 have the drawback of providing no anti-opening locking action when there is an axial load on the body of the lifting hook.

Providing this anti-opening locking function under load is a problem specific to karabiners used for climbing and potholing, since there is a risk of the karabiner opening when inserted in a piton or other roping device ring if the finger is near a wall, for example: if the forces on the ropes in the karabiner force the finger against the wall, it is pushed in the opening direction, i.e. towards the interior of the karabiner; when the finger pivots towards the open position, it no longer contributes to withstanding axial loads, which are taken only by the body of the karabiner, which in turn reduces the load capacity of the karabiner. It is therefore beneficial to prevent the karabiner finger opening in this way, especially if an axial traction load is applied to the karabiner body.

The problem addressed by the present invention is that of designing a new karabiner which, whilst avoiding the use of a hazardous hook part, combines good axial load strength with anti-opening locking under load.

Another requirement is to increase the mechanical strength of the karabiner without increasing its weight.

The solution of the invention must be compatible with a karabiner body and finger having a substantially constant transverse cross-section, as in karabiners used for climbing and potholing, to enable the karabiner to turn easily in the ring of a piton or other roping device.

The karabiner of the invention must additionally be easy to manufacture by means of simple machining operations.

SUMMARY OF THE INVENTION

To achieve the above and other objects, a karabiner of the invention comprises:

a generally C-shaped body the two ends of which are curved towards each other and separated by an opening, a finger having a first end articulated to a first end of said body about a transverse axis to pivot in a pivoting plane between an open position and a closed position in which a second end of said finger engages with a second end of said body to close said opening, the respective second ends of said body and said finger being shaped complementarily, respectively with a male end shape and a female end shape, adapted to fit one within the other at the end of closing movement in the pivoting plane, a first of said end shapes having at least one lateral protuberance in a direction substantially perpendicular to said pivoting plane of said finger and engaging in a lateral housing of the second of said end shapes, said lateral housing being shaped to allow unrestricted radial relative displacement of the corresponding lateral protuberance on pivoting relative movement of said finger with no axial load applied to said karabiner and to restrict to below a predetermined maximal value axial relative displacement of the corresponding lateral protuberance on deformation of said karabiner body under axial traction load, wherein:

said lateral housing is shaped to allow slight axial relative displacement of the corresponding lateral protuberance upon deformation of said karabiner body under axial traction load and to prevent radial relative displacement of the corresponding lateral protuberance in the direction of opening of said finger if the corresponding lateral protuberance has moved to the extent of said slight axial relative displacement due to said axial traction load applied to said karabiner body.

In a first embodiment the lateral protuberance is on the male end shape and engages in a corresponding housing in the female end shape.

In this case the lateral protuberance preferably has a shallow depth less than one tenth the diameter of the transverse cross-section of the karabiner body. The resulting shape prevents any hazard to ropes, straps or fingers in use.

In another embodiment the lateral protuberance is formed in the female end shape and engages in a corresponding housing formed on the male end shape.

In practise a first end shape advantageously comprises two opposed lateral protuberances engaging in opposed lateral housings of the second end shape.

Other objects, features and advantages of the present invention will emerge from the following description of specific embodiments of the invention given with reference to the appended drawings.

DETAILED DESCRIPTION OF THE PREFERRED EMBODIMENTS

Figure 1:
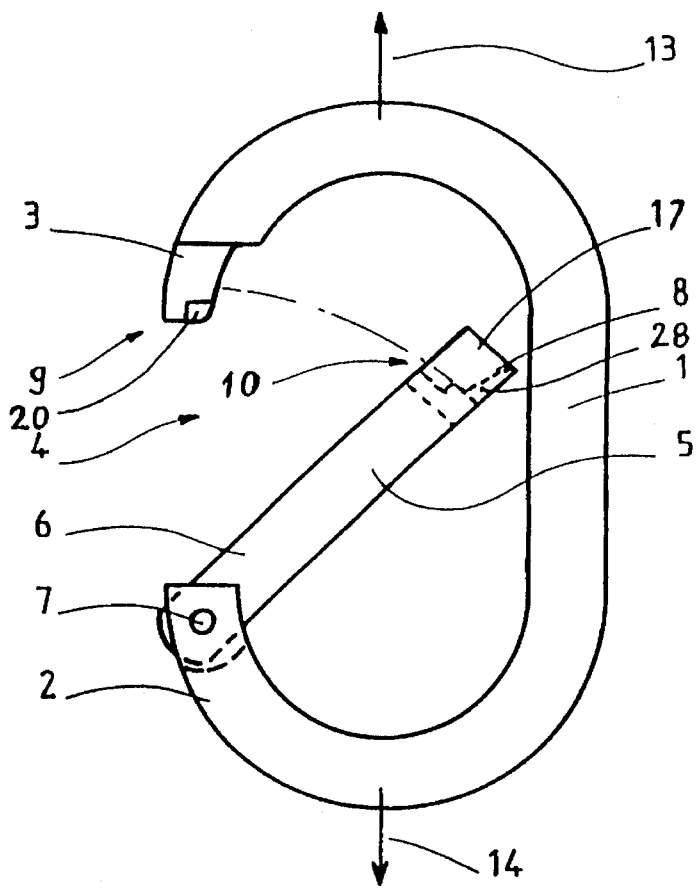
FIG. 1 shows a karabiner of the invention when open.
Figure 2:
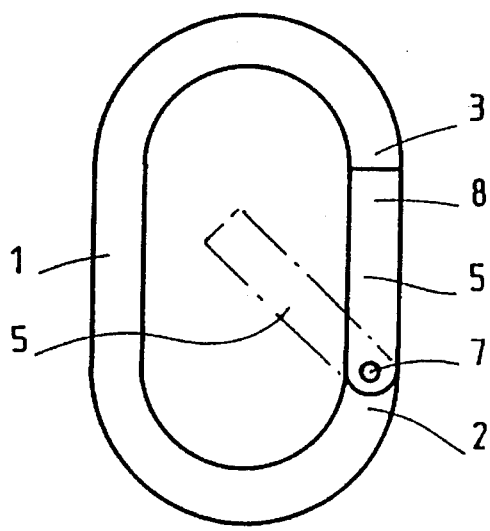
FIG. 2 shows a karabiner of the invention when closed, with no axial traction load on it.
Figure 3:
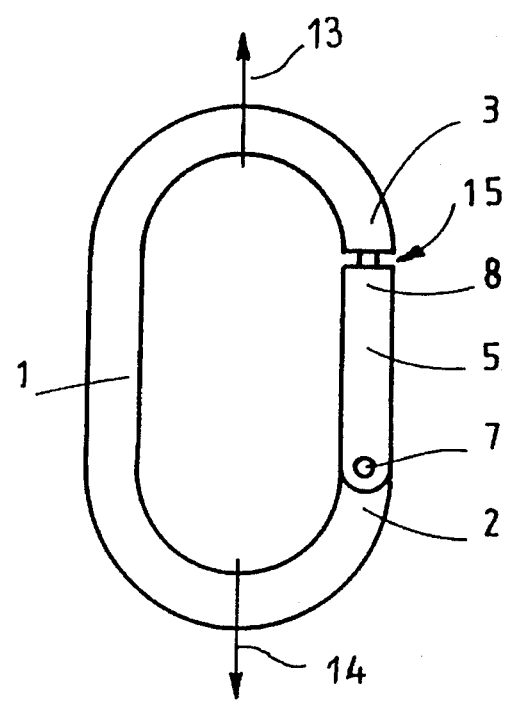
FIG. 3 shows a karabiner of the invention when closed and with an axial traction load on it.
Figure 4:
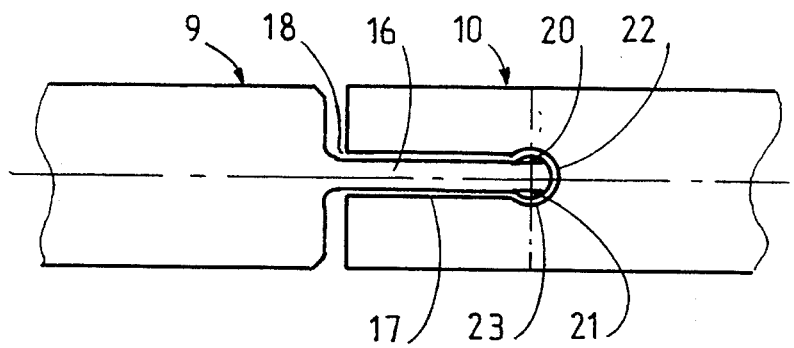
FIG. 4 is a part view as seen from the inside of the coupling area between the second ends of the finger and the body, in a first embodiment of the invention.

The karabiner shown in FIGS. 1 through 3 has a body 1 which is generally C-shaped with two ends 2 and 3 curved towards each other and separated by an opening 4. The finger 5 is articulated at a first end 6 to the first end 2 of the body 1 about a transverse axis 7 to pivot in a pivoting plane between an open position shown in FIG. 1 and a closed position shown in FIG. 2 in which the second end 8 of the finger engages with the second end 3 of the body 1 to close the opening 4.

The second ends 3 and 8 of the body 1 and the finger 5 have respective complementary shapes, namely a male end shape 9 and a female end shape 10, adapted to fit one within the other at the end of closing movement in the pivoting plane. The male end shape 9 can be either on the second end 8 of the finger 5 or on the second end 3 of the body 1, the female end shape 10 being then on the opposite second end of the body 1 or the finger 5, respectively.

The finger 5 is preferably spring-loaded into its closed position by spring means disposed near the articulation of the finger 5 about the transverse axis 7.

Referring to FIG. 2, with no axial traction load on the karabiner of the invention, the finger 5 can pivot freely between a closed position shown in full line and an open position shown in chain-dotted line.

With an axial traction load applied to the karabiner of the invention, as shown by the arrows 13 and 14 in FIG. 3, the body 1 tends to stretch so that the respective second ends 3 and 8 of the body 1 and the finger 5 move apart through axial relative displacement, indicated by the gap 15. In this position the finger 5 of the karabiner of the invention can no longer pivot towards its open position, this pivoting being prevented by dynamic locking means shown in the subsequent figures. Furthermore, the male end shape 9 and female end shape 10 are adapted to restrict to a predetermined maximal value the axial relative displacement of the second ends 3 and 8 of the body 1 and the finger 5.

In the embodiment shown in FIGS. 4 to 7 the male end shape 9 has a thinner end portion 16 engaging in a female end shape 10 having a slot 17 open at the end 18 and on a front penetration face 19. The slot 17 allows the thinner end portion of the male end shape 9 to pass through it, so that the finger 5 can pivot relative to the body 1.

The male end shape 9 has in its thinner end portion 16 two opposed lateral protuberances 20 and 21 substantially perpendicular to the pivoting plane of the finger, i.e. parallel to the transverse axis 7, and engaging in respective opposite lateral housings 22 and 23 formed in the lateral faces of the slot 17 of the female end shape 10. Each housing 22 or 23 has a radial portion 24 through which the corresponding lateral protuberance 20 or 21 can pass upon pivoting of the finger 5 relative to the body 1 in the absence of any axial traction load on the body 1.

Figure 5:
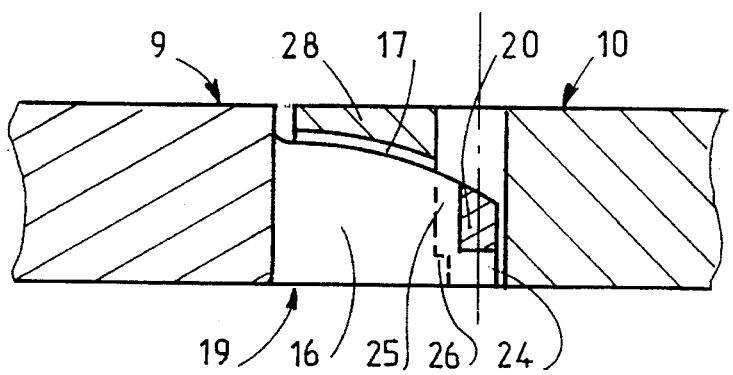
FIG. 5 is a side view in longitudinal section on the plane A—A in FIG. 6.
Figure 6:
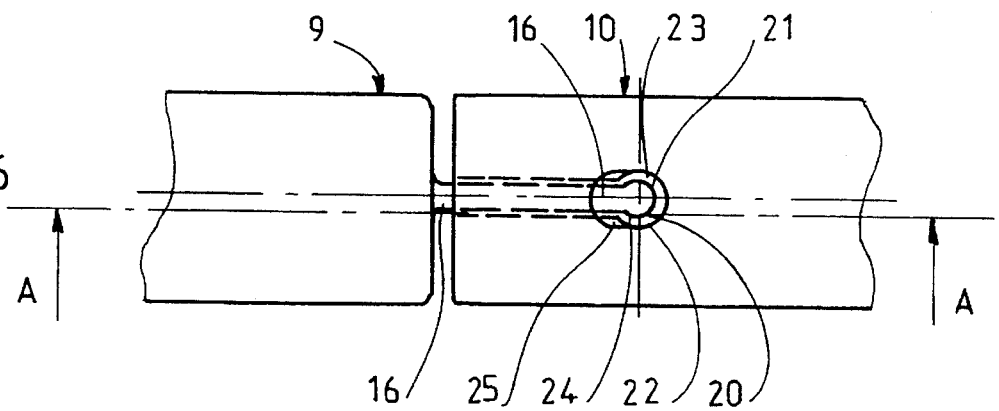
FIG. 6 is a view as seen from the outside of the coupling area between the second ends of the finger and the body, in the FIG. 4 embodiment of the invention.
Figure 7:
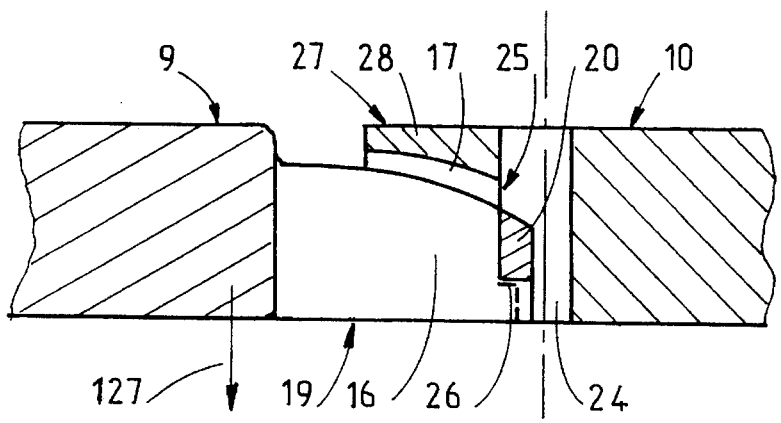
FIG. 7 is a view similar to that of FIG. 5 with an axial traction load applied to the karabiner body.
Figure 8:
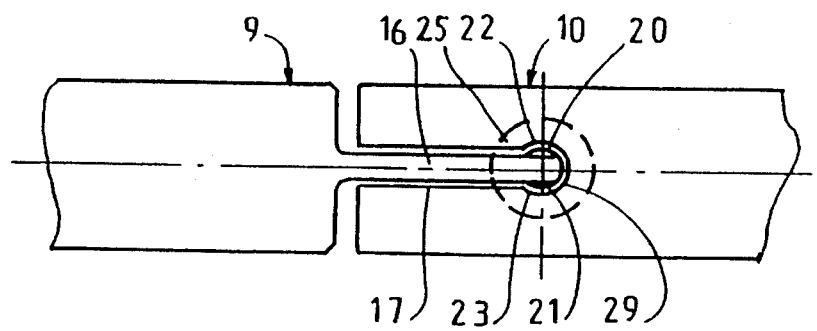
FIGS. 8 through 11 are respectively similar to FIGS. 4 through 7 and show a second embodiment of the karabiner of the invention.
Figure 9:
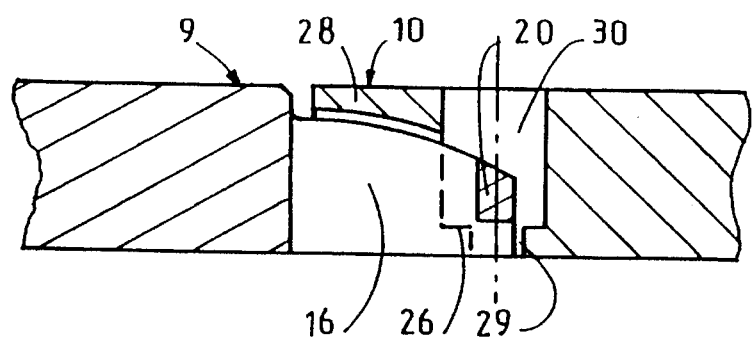
Figure 10:
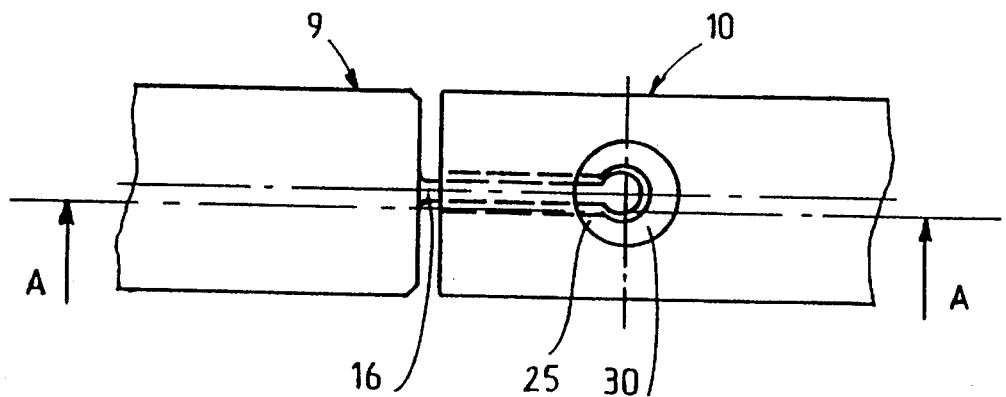
Figure 11:
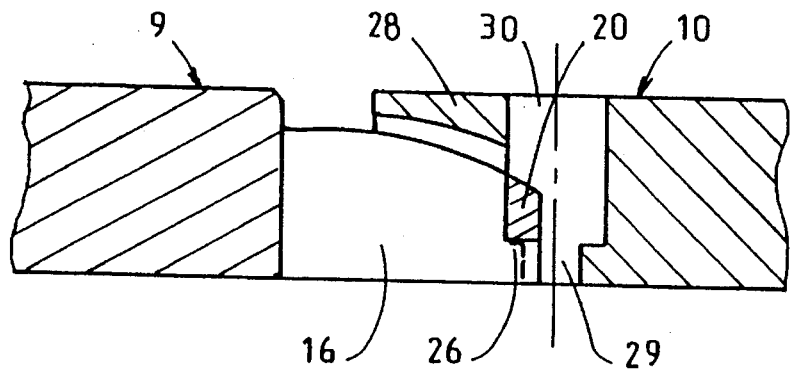
Figure 12:
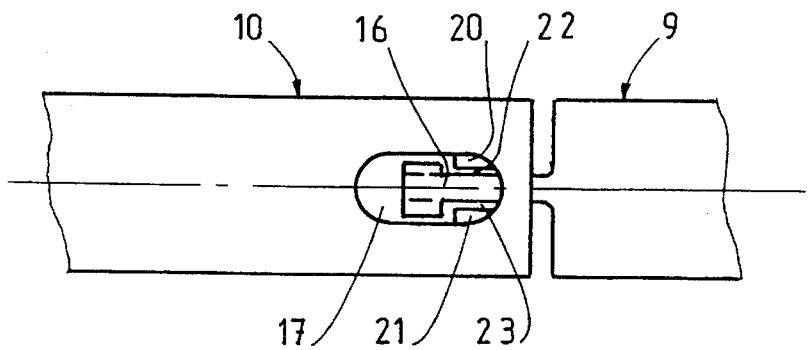
FIGS. 12 through 15 are respectively similar to FIGS. 4 through 7 and show a third embodiment of karabiner of the invention.
Figure 13:
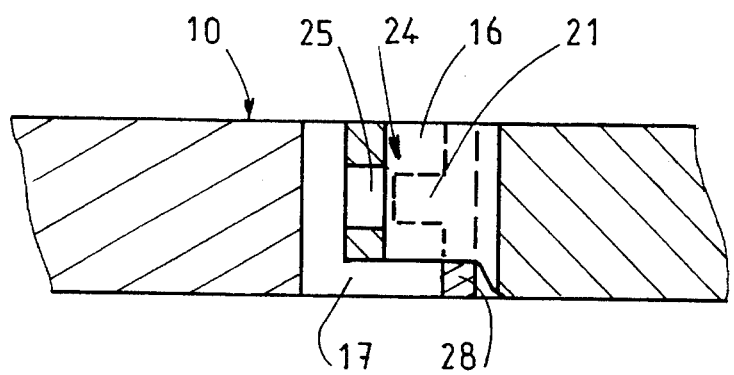
Figure 14:
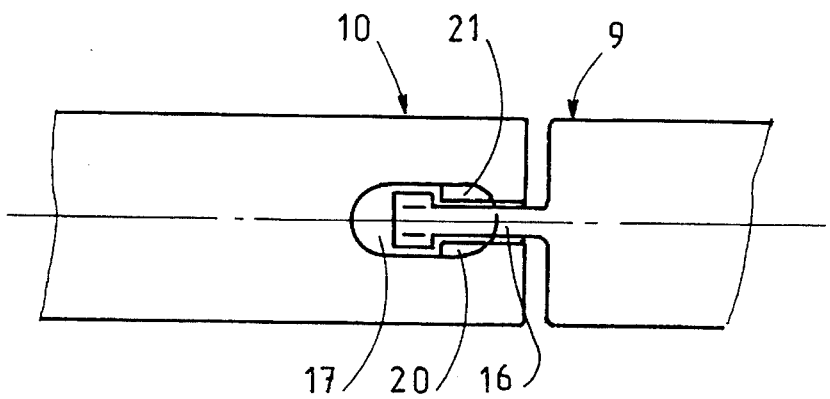

Each of the housings 22 and 23 also has an axial portion 25 to allow slight axial displacement of the corresponding lateral protuberance 20 or 21 on deformation of the karabiner body 1 under axial traction load and to restrict the axial displacement to less than a predetermined maximal value. FIG. 5 shows the components in the absence of any axial traction load on the karabiner body 1: the lateral protuberance 20 is accommodated in the radial portion 24 of the corresponding housing. In FIG. 7, on the other hand, with an axial traction load on the karabiner body 1 the end shapes 9 and 10 are slightly axially separated and the lateral protuberance 20 is engaged in the axial portion 25 of the corresponding housing, abutting against the end wall of said axial portion 25, which restricts its axial relative movement.

Each of the housings 22 and 23 is further shaped to prevent radial relative displacement of the corresponding lateral protuberance 20 or 21 in the finger opening direction when the karabiner body is deformed by an axial traction load. Accordingly, the axial portion 25 of the housing 22 includes a shoulder 26 which, in the position under axial traction load shown in FIG. 7, prevents relative movement of the male end shape 9 away from the female end shape 10 in the finger opening direction shown by the arrow 127.

In this embodiment (FIGS. 4 to 7) the radial portion 24 of the housings 22 and 23 is merely a radial through-hole. The axial portion 25 of the housings 22 and 23 is formed by ovalization of the outside part of the through-hole forming the radial portion 24, for example by displacement of a drilling tool inserted partially in the slot 17.

Note that to engage on the shoulder 26 the lateral protuberance 20 occupies a central position in the depth of the slot 17.

The female end shape 10 has a solid transverse portion 28 forming an abutment, blocking the slot 17 at the same end as the outside front face 27 opposite the penetration face 19, the solid transverse portion 28 preventing movement of the male end shape 9 beyond the closed position.

The embodiment of FIGS. 8 to 11 uses substantially the same components as the embodiment of FIGS. 4 to 7 and these components are identified by the same reference numbers.

This includes in particular the lateral protuberances 20 and 21 of the male end shape 9 engaged in the housings 22 and 23 of the female end shape 10 with the slot 17.

The difference compared to the previous embodiment relates to the constitution of the housings 22 and 23: in this embodiment the housings are formed by two coaxial holes, a smaller diameter first hole 29 and a larger diameter second hole 30 merging at the shoulder 26.

FIGS. 12 to 15 show another embodiment in which the lateral protuberances are provided in the female end shape 10. The main component parts of the previous embodiments, or their counterparts, are identified by the same reference numbers and include the thinner part 16 of the male end shape 9 and the slot 17 of the female end shape 10. The slot has a solid transverse portion 28 restricting relative travel of the finger beyond the closed position.

In this embodiment the lateral protuberances 20 and 21 are formed on the lateral faces of the slot 17 of the female end shape 10 and engage in corresponding lateral housings 22 and 23 on the lateral faces of the thinner end portion 16 of the male end shape 9. The lateral housings 22 and 23 have a radial part allowing radial relative displacement of the lateral protuberances 20 and 21 for the pivoting movement of the finger 5 relative to the body 1. The radial part 24 of the housing is the same, for example.

Figure 15:
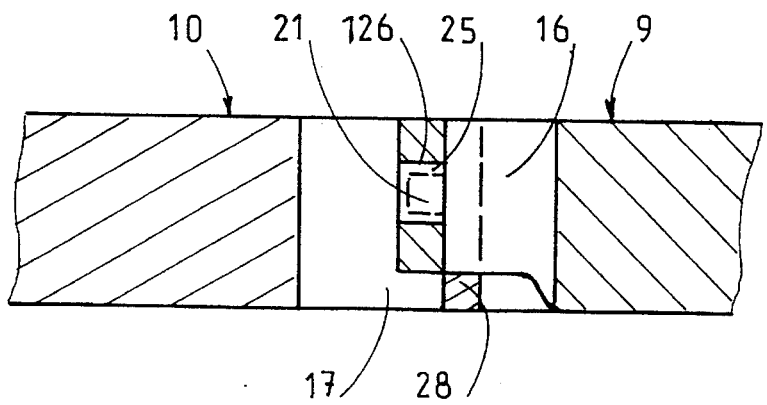

The housings 22 and 23 further have an axial portion 25 allowing axial relative displacement of the protuberances 20 and 21 when the karabiner is loaded in axial traction. In the position under traction load, as shown in FIG. 15, the lateral protuberance 21 engages in the axial portion 25 of the corresponding housing and abuts against a shoulder 126 which prevents the finger opening in the same way as the shoulder 26 in the previous embodiments.

In the embodiments of FIGS. 4 to 11, in which the lateral protuberances 20 and 21 are on the male end shape, the lateral protuberances 20 and 21 have a small depth, preferably less than one tenth the transverse cross-section diameter of the karabiner body 1. This avoids excessively sharp protuberances that could snag a strap, a rope or the fingers of the user when operating the karabiner.

In all the embodiments the karabiner of the invention has no hazardous hook-shape part.

The present invention is not limited to the embodiments explicitly described but encompasses variants and generalizations thereof within the scope of the following claims.

There is claimed:

1. Karabiner for climbing, potholing and like activities, comprising:
    a generally C-shaped body the two ends of which are curved towards each other and separated by an opening,
    a finger having a first end articulated to a first end of said body about a transverse axis to pivot in a pivoting plane between an open position and a closed position in which a second end of said finger engages with a second end of said body to close said opening,
    the respective second ends of said body and said finger being shaped complementarily, respectively with a male end shape and a female end shape, adapted to fit one within the other at the end of closing movement in the pivoting plane,
    a first of said end shapes having at least one lateral protuberance in a direction substantially perpendicular to said pivoting plane of said finger and engaging in a lateral housing of the second of said end shapes,
    said lateral housing being shaped to allow unrestricted radial relative displacement of the corresponding lateral protuberance on pivoting relative movement of said finger with no axial load applied to said karabiner and to restrict to below a predetermined maximal value axial relative displacement of the corresponding lateral protuberance on deformation of said karabiner body under axial traction load, wherein:
    said lateral housing is shaped to allow slight axial relative displacement of the corresponding lateral protuberance upon deformation of said karabiner body under axial traction load and to prevent radial relative displacement of the corresponding lateral protuberance in the direction of opening of said finger if the corresponding lateral protuberance has moved to the extent of said slight axial relative displacement due to said axial traction load applied to said karabiner body.

2. Karabiner according to claim 1 wherein said lateral protuberance is on said male end shape and engages in a corresponding housing in said female end shape.

3. Karabiner according to claim 2 wherein said lateral protuberance has a shallow depth less than one tenth the diameter of the transverse cross-section of said karabiner body.

4. Karabiner according to claim 1 wherein said lateral protuberance is formed in said female end shape and engages in a corresponding housing formed on said male end shape.

5. Karabiner according to claim 1 wherein a first end shape comprises two opposed lateral protuberances engaging in opposed lateral housings of the second end shape.

6. Karabiner according to claim 1 wherein said female end shape includes a transverse portion forming an abutment limiting movement of said male end shape beyond said closed position.

7. Karabiner according to claim 1 wherein said female end shape is a slot open at the end and on a front penetration face to allow said male end shape to pass through it upon pivoting movement of said finger.

8. Karabiner according to claim 1 wherein said finger is spring-loaded into its closed position by spring means.

9. A karabiner comprising:
    an elongated body defining an opening, and a finger having a first end pivotably connected to the body, wherein the finger comprises means for closing said opening when the finger is moved in a radial direction, the body being deformable in an axial direction, the axial direction being generally perpendicular to the radial direction,
    the body and the finger having complementary end shapes which engage each other, wherein a first of said end shapes is configured to allow a second of said end shapes to move freely within the first of said end shapes, wherein the first and second end shapes allow unrestricted radial movement of the finger when no axial load is applied to the body, the end shapes also comprising means for limiting axial movement of one of the end shapes when an axial load is applied to the body,
    the end shapes also comprising means for allowing slight axial displacement of one of the end shapes, when the body is deformed in the axial direction, and means for preventing movement of the finger in the radial direction, when the body is deformed in the axial direction.

\* \* \* \* \*